United States Patent [19]

Svensson et al.

[11] Patent Number: 4,559,986
[45] Date of Patent: Dec. 24, 1985

[54] BARKING DRUM WITH AT LEAST ONE BEARING RING

[75] Inventors: Sven A. Svensson, Själevad; Bo J. M. Oledal, Frösön; Stig-Gunnar E. Löfgren, Järved, all of Sweden

[73] Assignee: KMW Aktiebolag, Karlstad, Sweden

[21] Appl. No.: 629,267

[22] Filed: Jul. 10, 1984

[30] Foreign Application Priority Data

Jul. 11, 1983 [SE] Sweden ............................... 8303923

[51] Int. Cl.⁴ .............................................. B27L 1/00
[52] U.S. Cl. ................................ 144/208 B; 241/182; 254/104; 269/234
[58] Field of Search ............... 241/182, 183, 170, 176; 144/208 R, 208 B; 254/104; 269/48.1, 234

[56] References Cited

U.S. PATENT DOCUMENTS

| | | | |
|---|---|---|---|
| 2,547,789 | 4/1951 | Skeel | 269/234 X |
| 3,390,862 | 7/1968 | Schrepfer | 254/104 |
| 3,701,487 | 10/1972 | Quesnel | 241/182 |
| 3,783,918 | 1/1974 | Simpson et al. | 241/182 |
| 3,807,470 | 4/1974 | Young | 144/208 B |
| 4,184,665 | 1/1980 | Queen, Jr. | 254/104 |

Primary Examiner—W. D. Bray
Attorney, Agent, or Firm—Bell, Seltzer, Park & Gibson

[57] ABSTRACT

A barking drum has a substantially cylindrical drum shell (1) with an essentially horizontal axis and at least one bearing ring (3) or similar device. The ring (3) surrounds an annular portion of the shell (1) and forms an interjacent gap (5). Further, the ring (3) is fixed relative to the drum shell (1) by means of a plurality of fastening means (7) fitted in the gap (5) and spaced at equal distances around the circumference of the shell. In order to produce an improved fixing of the ring (3) and the shell (1) in relation to each other, at least some of the fastening means (7) consist of an adjustable clamp that is expandable in a radial direction relative to the shell (1) and which is so constructed that any resilience is negligible, so that the ring (3) is substantially rigidly clamped onto the shell (1).

12 Claims, 5 Drawing Figures

BARKING DRUM WITH AT LEAST ONE BEARING RING

FIELD AND BACKGROUND OF THE INVENTION

The present invention relates to a barking drum comprising a substantially cylindrical drum shell with an essentially horizontal axis and at least one bearing ring which surrounds an annular portion of the shell to form an interjacent gap and which is fixed relative to the drum shell by means of a plurality of fastening means fitted in the gap and spaced at equal distances around the circumference of the shell.

Bearing rings and similar devices on large rotatable drums with an essentially horizontal axis are usually secured onto the drum shell either by means of welding or by means of a screw joint. In order to be able to orient the bearing rings correctly in relation to each other, the inner diameter of the rings is usually larger than the outer diameter of the drum shell, so that an annular gap is formed between ring and shell.

When welding, several different methods of filling up this gap are used. Most frequently the gap is made so small that it can be bridged directly by weld metal. However, it is not uncommon that large drums become oval when they are at a standstill for a long period without being rotated. A disadvantage of a welded bearing ring is that it is very laborious work to alter the alignment of the ring. In addition, there are often problems with the formation of cracks in the welded joint.

When using screw joints, the ring is fixed in position on the shell by means of spacers or wedges before securing, such as in Swedish Pat. No. 187 268 (A. Ahlstrom Oy). The screw attachment is relatively expensive and, more importantly, on barking drums operating in a corrosive environment, there are often problems with corrosion between the wedge and bearing ring and between the wedge and drum shell. After a few years in service, this will cause the screw joint to loosen and it must be refastened.

In addition, the screw joint requires holes to be drilled in both the ring and the shell. Such drilling is usually done before the respective blank is bent to form the ring and the shell, which easily leads to the holes in the ring and the shell not covering each other exactly, such that one or more of the screws will have an orientation deviating from a purely radial direction.

Further, it is suggested in U.S. Pat. No. 3,783,918 (Simpson et al.) that the ring be held in position on the drum shell by pressing into the gap a plurality of rubber rods or similar elastomeric spacers, which keep the ring elastically resiliently centered on the drum and thereby considerably dampen the transmission of impact shocks from drum to the support means which carry the drum rotatably. Such an elastically resilient fastening of the ring onto the drum shell presents a problem, however, in that the drive of the barking drum cannot take place by the use of a conventional gear drive or pin gear, due to the resilient movements changing the gear teeth engagement, and destroying the lubricating oil film.

An object of the present invention is to produce an improved fixing of the bearing ring and the drum shell relative to each other. The degree of fixation should not change over a period of time, preferably not even in a corrosive environment. Nonetheless, any new alignment of the ring should only require relatively little work, and it should be possible to use a conventional gear drive or pin gear.

SUMMARY OF THE INVENTION

This object is attained with the barking drum of the invention in that at least a plurality of the fastening means are clamping devices which are expandable in a radial direction relative to the shell by screwing and which are so constructed that any resilience is negligible, so that the ring is essentially rigidly clamped onto the shell.

The barking drum according to the invention is preferably constructed in such a way that each clamping device comprises a first plate of metal with one face coated with a 10 mm maximum thick layer of set-resistant rubber to bear against the bearing ring, a second plate of metal with one face coated with a 10 mm maximum thick layer of set-resistant rubber to bear against the drum shell, a flat wedge of metal located between and supporting the two plates, and with the longitudinal direction of the wedge coinciding with the longitudinal direction of the drum and with diminishing thickness in this direction, and a screw means for displacing the wedge in its longitudinal direction between the plates and thereby changing the distance therebetween, so that the drum shell can be fixed substantially rigidly clamped in a desired position in the bearing ring.

A fastening with such clamping devices will give great flexibility as to the location of the drum shell in the ring. The thin rubber coating permits a good contact, even against an oval drum shell, while the resilience will be negligible due to the thickness of the rubber coating in relation to its length and width. The rubber coating also forms a seal between shell and ring, so that moisture cannot penetrate and cause corrosion which would result in a loosening of the joint. Since it is not necessary to drill holes in the drum shell or the ring, this design will also be considerbly cheaper than that with a conventional screw joint provided with wedges.

Other distinctive features which characterize preferred embodiments of the invention are stated in the attached patent claims. The invention will now be described in more detail with reference to the attached drawings.

DESCRIPTION OF ILLUSTRATED EMBODIMENTS

Figure 1:
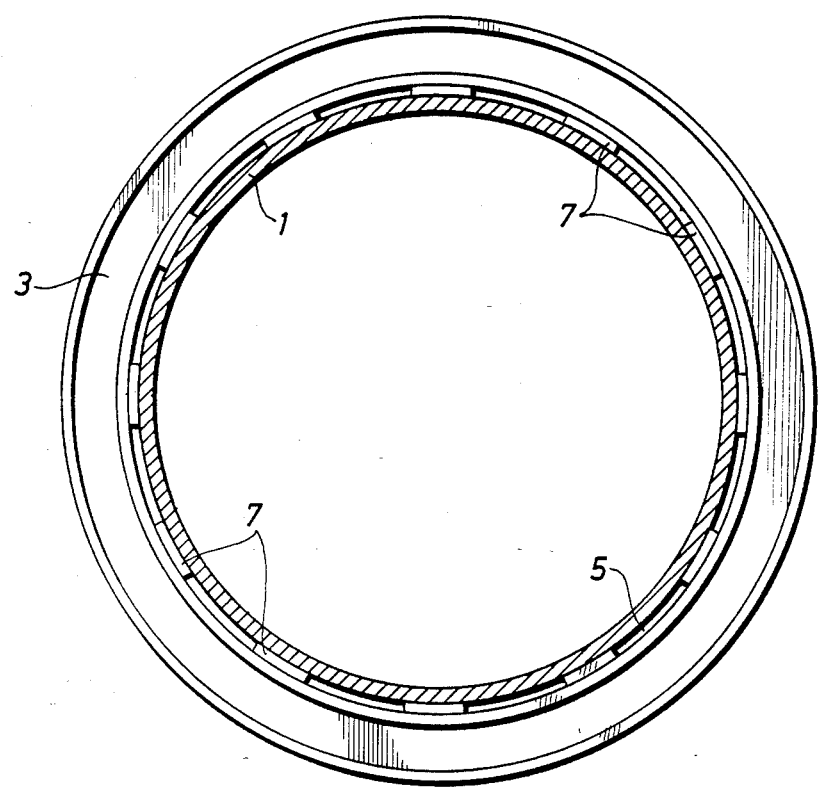
FIG. 1 is a vertical sectional view which shows schematically a barking drum shell and a bearing ring or similar device, which according to the invention is fastened onto the shell by means of clamping elements that are expandable in a radial direction through screwing.

The barking drum shown in FIG. 1 comprises a substantially cylindrical drum shell 1 with an essentially horizontal axis and at least one bearing ring 3 or similar device, which surrounds an annular portion of the shell 1 and forms an interjacent gap 5. The ring 3 is fixed relative to the drum shell 1 by means of a plurality of fastening means 7 fitted in the gap and spaced at equal distances around the circumference of the shell. In the embodiment shown in FIG. 1, twelve fastening means 7 have been used, but this number could be larger or smaller depending on the sizes of drum shell and ring, etc. It should be pointed out that the barking drum is only shown schematically, and that conventional details that do not concern the invention have been omitted in the figure. For example, the drum shell is provided on the inside with a plurality of conventional log lifters, which are not shown.

According to the invention, at least a plurality of the fastening means consist of such clamping devices 7 that by means of screwing are expandable in a radial direction relative to the shell 1 and are so constructed that any resilience is negligible, so that the ring 3 is substantially rigidly clamped onto the shell 1.

Figure 2:
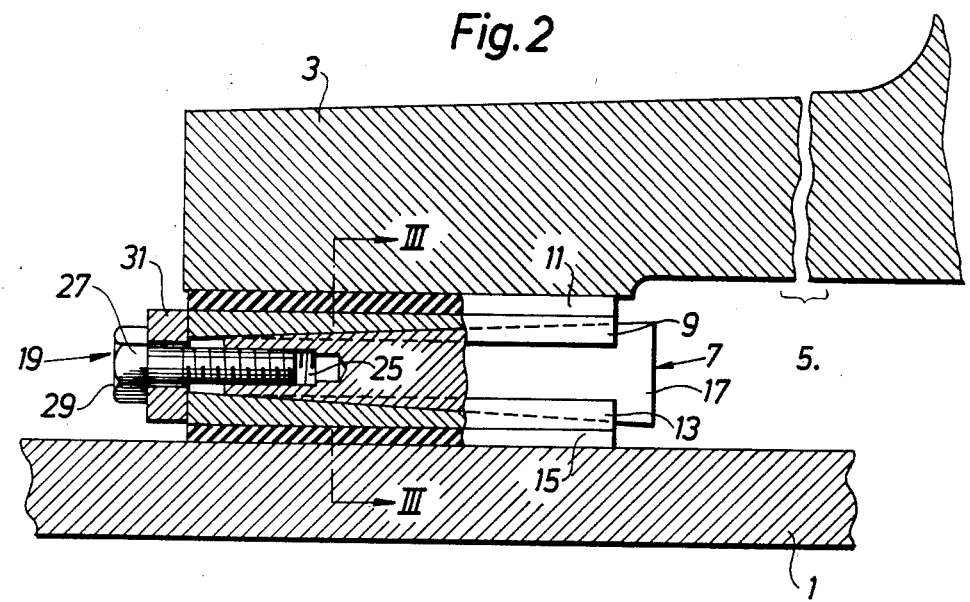
FIG. 2 is a side view of a clamping device shown partly in a longitudinal section and according to a first preferred embodiment of the invention inserted btween the drum shell and a cylindrical inner surface of the ring.
Figure 3:
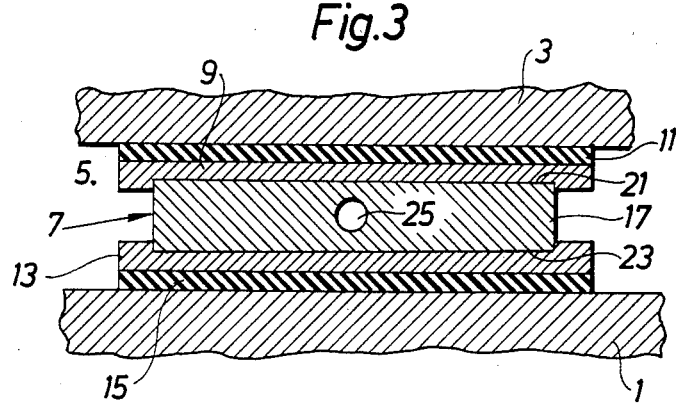
FIG. 3 is a cross sectional view showing the section III—III in FIG. 2.

A first preferred embodiment is shown in FIGS. 2 and 3. Each clamping device 7 comprises a first plate 9 and a second plate 13, both of metal and with one face coated with a layer 11 and 15, respectively, of set-resistant rubber of maximum 10 mm thickness for bearing against the bearing ring 3 and the shell 1, respectively. The contact surface on each of the plates 9 and 13 has an area which is several times as large as the area of the contact surface of a conventional, wedge-shaped fastening means. An irreversible flat wedge 17 is located between and supports the plates 9 and 13. The longitudinal direction of the wedge 17 coincides with the longitudinal direction of the drum, and the thickness of the wedge 17 diminishes in the longitudinal direction. Further, each clamping device 7 comprises a screw means 19 for displacing the wedge 17 in its longitudinal direction between the plates 9 and 13 and thereby changing the distance between the plates so that the drum shell 1 can be fixed substantially rigidly clamped in a desired position in the bearing ring 3.

The comparatively thin rubber layer 11 and 13 with a maximum thickness of 10 mm permits good contact, even against an oval drum shell 1. The rubber layer also forms a seal against the shell 1 and the ring 3, respectively, so that moisture cannot penetrate and lead to corrosion that will cause the joint to loosen. Since the comparatively thin rubber layers 11 and 15 have, in relation to the thickness, large contact surfaces against the ring 3 and the shell 1, respectively, and are solidly clamped, the resilience in the rubber layers will be negligible. The rubber should be set-resistant to prevent a reduction of the clamping force over a period of time, which could cause the joint to loosen. The area of the contact surface of each rubber layer is suitably larger than approximately 1 square decimeter, preferably at least approximately 1.5 square decimeters, and has suitably a substantially square shape. In the preferred embodiment shown in FIGS. 2 and 3, the rubber layer has a length of approximately 12 cm in the longitudinal direction of the shell 1 and a width of approximately 13 cm in the circumferential direction of the shell. If the clamping devices 7 are used to replace wedges in a barking drum where the ring attachment is being renovated, it is self-evident, however, that due regard must be taken to shape and dimensions for the gap in which the clamping devices shall be fitted.

In the preferred embodiment shown in FIGS. 2 and 3, the contact surface of the first plate 9 against the bearing ring 3 is convex and the contact surface of the second plate 13 against the drum shell 1 is concave. The plates 9 and 13 are each provided with a groove 21 and 23, respectively, for receiving the wedge 17. The grooves are shaped complementary to the wedge 17, so that the two contact surfaces are at least substantially parallel to each other. By this means, the contact surface of the ring 3 for the clamping devices 7 can be cylindrical, which will be simpler and cheaper to manufacture.

Further, the wedge 17 has a thin end, which is provided with a threaded hole 25 extending in the longitudinal direction of the wedge 17 and the drum, and a screw means 19 comprising a headed screw 27, which is partially screwed into the hole 25 and with its head 29 is bearing at least indirectly against end faces of the two plates 9 and 13, so that on tightening the screw 27 the wedge 17 is pulled in a direction towards the screw head 29 and forces apart the plates 9 and 13. Suitably, a heavy washer 31 is located between the screw head 29 and said end faces of the plates 9 and 13 in order to transmit the compressive force from the screw head 29 to the plates 9 and 13.

Figure 4:
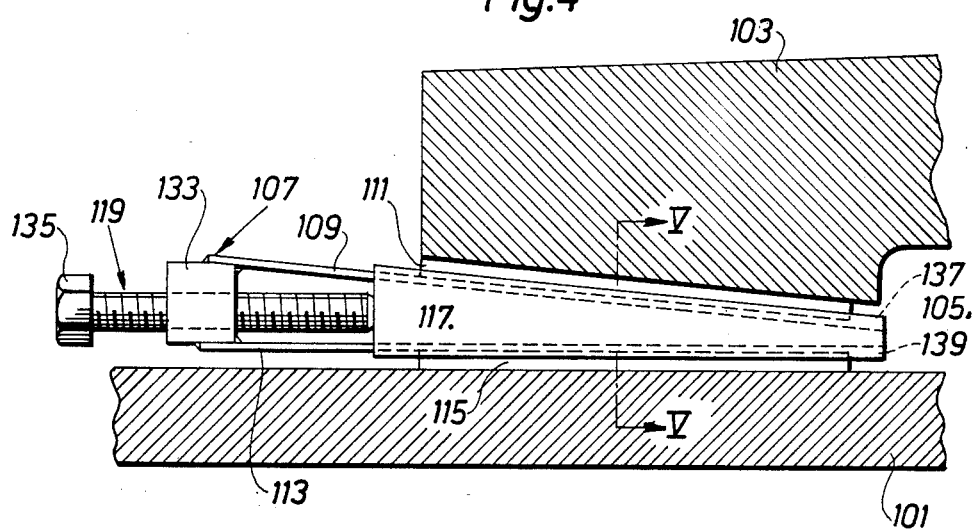
FIG. 4 is a side view similar to that in FIG. 2 of a clamping device according to a second preferred embodiment of the invention inserted between the drum shell and a conical inner surface of the ring.
Figure 5:
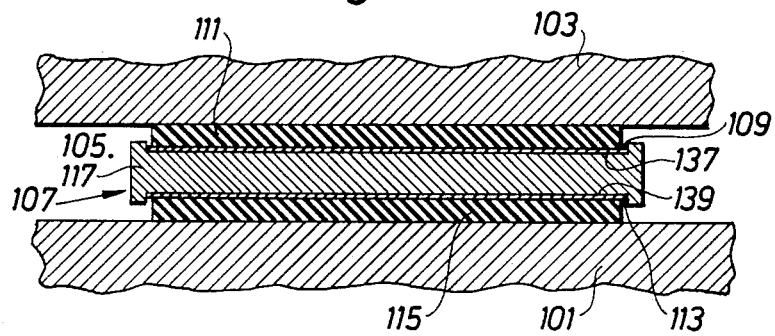
FIG. 5 is a cross sectional view showing the section V—V in FIG. 4.

Alternatively, the clamping device can be designed in the manner shown in FIGS. 4 and 5, which is particularly suitable in the case where the contact surface of the ring for the clamping device has a conical shape. To emphasize the similarities between the embodiment according to FIGS. 4 and 5 and that according to FIGS. 2 and 3, corresponding reference numbers have been used in FIGS. 4 and 5 as in FIGS. 2 and 3, but from the 100 series.

Thus, the ring 103 is fixed on the shell 101 by means of clamping devices 107 located in the interjacent gap 105. Each clamping device comprises a first plate 109 with a rubber layer 111 for bearing against the ring 103, and a second plate 113 with a rubber layer 115 for bearing against the shell 101. Between the plates there is provided the wedge 117, which can be displaced between the plates 109 and 113 by means of the screw means 119 to force the plates apart, so that the screw means expands radially in relation to the drum shell 101 and fixes the ring 103 on the shell 101.

In the embodiment shown in FIGS. 4 and 5, the screw means 119 comprises a nut means 133 firmly connected to the two plates 109 and 113, and with a screw 135 interacting with the nut means 133 and extending therethrough. One end of the screw bears against the thick end of the wedge 117, so that on tightening the screw 135 the wedge 117 is pushed in a direction away from the nut means 133 and forces apart the plates 109 and 113. The nut means 133 extends suitably across substantially the full width of the plates 109 and 113 in the circumferential direction of the shell 101 and is sufficiently substantial to resist all appreciable deformation.

As distinguished from the wedge 17, the wedge 117 is bent to coincide with the curve of the gap 105, and it is provided with two grooves 137 and 139 of substantially constant depth for receiving the two plates 109 and 113, which are also bent, namely to coincide with the curve of the gap 105 at the ring 103 and the shell 101, respectively.

As indicated above, the bearing ring 103 has an inwardly facing, conically diminishing surface portion, which demarcates the gap 105 in a direction radially outwards. Further, the two curved plates 109 and 113 are substantially of equal thickness and sufficiently thin to be able to be deformed if necessary into exact agreement with the curve of the wedge 117 by tightening the screw 135. This embodiment of the clamping devices 107 is particularly suitable when they shall replace conventional, rigid and narrow nonexpandable wedges when renovating the ring attachment of barking drums.

To avoid corrosion as far as possible, it is preferable that the metal of at least the plates and the wedge consists of stainless steel. Further, it is desirable that the clamping devices 107 are preloaded to such a degree that even with maximum working load in the drum, a certain preload will remain in the uppermost of the clamping devices 107.

The invention is not limited to the embodiments shown in the drawings and described above, but several variations and modifications of the two embodiments are conceivable within the scope of the claims which follow.

That which is claimed is:

1. A barking drum comprising a substantially cylindrical drum shell, at least one bearing ring surrounding said drum shell and forming an interjacent gap with the shell, and a plurality of fastening means fitted in the gap and spaced at substantially equal distances around the circumference of the shell, at least a plurality of said fastening means comprising clamps including means cooperating with said ring and said shell for rigidly and nonresiliently clamping the ring to the shell, and including threaded means for expanding the clamps in a radial direction relative to the shell to permit easily realigning the ring on the shell.

2. A barking drum according to claim 1 wherein each of said clamps includes a first metal plate having a layer of set-resistant rubber on one face thereof oriented for bearing against said ring a second metal plate having a layer of set-resistant rubber on one face thereof oriented for bearing against said drum shell, a metal wedge located between and supporting said first and second metal plates, the longitudinal dimension of said wedge corresponding to the longitudinal axis of the drum shell and the thickness of said wedge diminishing in the longitudinal dimension, and screw means cooperating with said wedge for displacing the wedge in its longitudinal direction between said plates for thereby changing the distance between the plates whereby the drum shell is substantially rigidly clamped in a desired position in the bearing ring.

3. A barking drum according to claim 2 wherein the layers of set-resistant rubber on said first and second plates have a maximum thickness of 10 mm.

4. A barking drum according to claim 2 wherein the contact surface of said first plate against the ring is convex and the contact surface of said second plate against the drum shell is concave.

5. A barking drum according to claim 2 wherein said first and second plates are each provided with a groove for receiving said wedge, the grooves being shaped complementary to the wedge so that said two contact surfaces are substantially parallel to each other.

6. A barking drum according to claim 2 wherein the wedge has a thin end which is provided with a threaded hole which extends in the longitudinal direction of the wedge and the drum, and said screw means comprises a headed screw which is partially screwed into the hole and with its head bearing at least indirectly against end faces of the two plates, so that on tightening the screw, the wedge is pulled in a direction towards the screw head and forces apart said first and second plates.

7. A barking drum according to claim 2 wherein said screw means comprises a nut firmly connected to said two plates, and a screw interacting with the nut, extending through the nut and with one of its ends bearing against the thick end of the wedge so that on tightening the screw the wedge is pushed in a direction away from the nut and forces apart said two plates.

8. A barking drum according to claim 7 wherein said wedge is curved to coincide with the curve of the gap and is provided with two grooves of substantially constant depth for receiving the said first and second plates, and wherein said two plates are curved to coincide with curve of the gap between the ring and the drum shell.

9. A barking drum according to claim 8 wherein said bearing ring has an inwardly facing conically tapering surface portion, which demarcates the gap in a direction radially outwards, and the two curved plates are of substantially equal thickness and sufficiently thin to be able to be deformed if necessary into exact agreement with the curve of the wedge by tightening the screw.

10. A barking drum according to claim 2 wherein the metal of said plates and wedge consists of stainless steel.

11. A barking drum comprising a substantially cylindrical drum shell oriented with its longitudinal axis extending generally horizontally, at least one bearing ring surrounding said drum shell and forming an interjacent gap with the shell, and a plurality of fastening means fitted in the gap and spaced at substantially equal distances around the circumference of the shell for clamping the bearing ring to the drum shell, at least a plurality of said fastening means comprising clamps including a first metal plate having a layer of set-resistant rubber of maximum thickness of 10 mm on one face thereof oriented for bearing against said ring, a second metal plate having a layer of set-resistant rubber of maximum thickness of 10 mm on one face thereof oriented for bearing against said drum shell, a metal wedge located between and supporting said first and second metal plates, the longitudinal dimension of said wedge corresponding to the longitudinal axis of said drum shell and the thickness of said wedge diminishing in the longitudinal dimension, and screw means threadably engaging said wedge and cooperating therewith for displacing the wedge in its longitudinal dimension between said plates for thereby expanding the clamp in a radial direction relative to said shell to thereby substantially rigidly clamp the drum shell in a desired position in the bearing ring.

12. A barking drum according to claim 11 wherein said clamps are preloaded to such a degree that even with maximum working load in the drum, a preload will remain in the uppermost of the clamping devices.

* * * * *